United States Patent
Ojanpera (10) Patent No.: US 9,392,363 B2
(45) Date of Patent: Jul. 12, 2016

(54) AUDIO SCENE MAPPING APPARATUS

(75) Inventor: Juha Petteri Ojanpera, Nokia (FI)

(73) Assignee: Nokia Technologies Oy, Espoo (FI)

( * ) Notice: Subject to any disclaimer, the term of this patent is extended or adjusted under 35 U.S.C. 154(b) by 44 days.

(21) Appl. No.: 14/351,326

(22) PCT Filed: Oct. 14, 2011

(86) PCT No.: PCT/IB2011/054565
§ 371 (c)(1),
(2), (4) Date: Jun. 30, 2014

(87) PCT Pub. No.: WO2013/054159
PCT Pub. Date: Apr. 18, 2013

(65) Prior Publication Data
US 2015/0043756 A1    Feb. 12, 2015

(51) Int. Cl.
| H04B 1/00 | (2006.01) |
| H04R 3/00 | (2006.01) |
| H04R 5/027 | (2006.01) |
| G10L 19/02 | (2013.01) |
| G10L 19/16 | (2013.01) |
| G11B 20/10 | (2006.01) |

(52) U.S. Cl.
CPC .......... *H04R 3/00* (2013.01); *H04R 5/027* (2013.01); *G10L 19/02* (2013.01); *G10L 19/173* (2013.01); *G11B 20/10* (2013.01)

(58) Field of Classification Search
None
See application file for complete search history.

(56) References Cited

U.S. PATENT DOCUMENTS

| 2007/0081663 A1 | 4/2007 | Sakurai et al. |
| 2010/0305732 A1 | 12/2010 | Serletic |
| 2011/0013790 A1 | 1/2011 | Hilpert et al. |
| 2011/0182432 A1 | 7/2011 | Ishikawa et al. |

FOREIGN PATENT DOCUMENTS

| WO | 2007037700 | 4/2007 |
| WO | 2009068086 | 6/2009 |
| WO | 2010091736 | 8/2010 |
| WO | 2011/064438 A1 | 6/2011 |
| WO | 2011101708 | 8/2011 |

OTHER PUBLICATIONS

International Search Report received for corresponding Patent Cooperation Treaty Application No. PCT/IB2011/054565, dated Jun. 29, 2012, 6 pages.
Extended European Search Report received for corresponding European Patent Application No. 11873915.0, dated Jun. 30, 2015, 7 pages.
Written Opinion for International Patent Application No. PCT/IB2011/054565 dated Jun. 29, 2012.

*Primary Examiner* — Regina N Holder
(74) *Attorney, Agent, or Firm* — Alston & Bird LLP (57) ABSTRACT

An apparatus comprising: at least one processor and at least one memory including computer code for one or more programs, the at least one memory and the computer code configured to with the at least one processor cause the apparatus to at least perform: receiving at least two signals comprising at least two audio signals from at least two recording apparatus recording within an audio scene an audio source, wherein the first of the at least two audio signals is configured to represent a first frequency range and the second of the at least two audio signals is configured to represent a second frequency range; scaling the at least two audio signals; and combining the at least two audio signals to generate a combined audio signal representation of the audio source.

12 Claims, 5 Drawing Sheets

AUDIO SCENE MAPPING APPARATUS

RELATED APPLICATION

This application was originally filed as PCT Application No. PCT/IB2011/054565 filed Oct. 14, 2011.

FIELD OF THE APPLICATION

The present application relates to apparatus for the processing of audio and additionally audio-visual signals. The invention further relates to, but is not limited to, apparatus for processing audio and additionally audio-visual signals from mobile devices.

BACKGROUND OF THE APPLICATION

Viewing recorded or streamed audio-video or audio content is well known. Commercial broadcasters covering an event often have more than one recording device (video-camera/microphone) and a programme director will select a 'mix' where an output from a recording device or combination of recording devices is selected for transmission.

Multiple 'feeds' may be found in sharing services for video and audio signals (such as those employed by YouTube). Such systems, which are known and are widely used to share user generated content recorded and uploaded or up-streamed to a server and then downloaded or down-streamed to a viewing/listening user. Such systems rely on users recording and uploading or up-streaming a recording of an event using the recording facilities at hand to the user. This may typically be in the form of the camera and microphone arrangement of a mobile device such as a mobile phone.

Often the event is attended and recorded from more than one position by different recording users at the same time. The viewing/listening end user may then select one of the up-streamed or uploaded data to view or listen.

SUMMARY OF THE APPLICATION

Aspects of this application thus provide an audio recording or capture process whereby multiple devices can be present and recording audio signals and the recording or capture processing load can be more effectively spread among the capture apparatus.

There is provided according to the application an apparatus comprising at least one processor and at least one memory including computer code for one or more programs, the at least one memory and the computer code configured to with the at least one processor cause the apparatus to at least perform: receiving at least two signals comprising at least two audio signals from at least two recording apparatus recording within an audio scene an audio source, wherein the first of the at least two audio signals is configured to represent a first frequency range and the second of the at least two audio signals is configured to represent a second frequency range; scaling the at least two audio signals; and combining the at least two audio signals to generate a combined audio signal representation of the audio source.

Receiving the at least two signals from at least two recording apparatus may further cause the apparatus to perform demultiplexing from each signal at least one of the audio signals.

The apparatus may further be caused to perform demultiplexing from each signal at least one parameter associated with each audio signal.

Scaling the at least two audio signals may further cause the apparatus to perform scaling each audio signal dependent on the at least one parameter associated with each audio signal.

Scaling each audio signal dependent on the at least one parameter associated with each audio signal may cause the apparatus to perform scaling the at least one audio signal dependent on the estimation of an energy of the audio signal; and an estimation of the ratio of the energy of the audio signal frequency range with respect to a full band energy value.

Each audio signal may be a frequency domain representation audio signal comprising at least one frequency sample value, wherein combining the at least two audio signals to generate a combined audio signal representation of the audio source may cause the apparatus to append the at least two audio signals.

The apparatus may be further caused to demultiplex from each encapsulated signal a frequency range indicator associated with each audio signal, wherein appending the at least two audio signals may further cause the apparatus to append the at least two audio signals dependent on the frequency range indicator.

The apparatus may be further caused to perform a frequency to time domain transform on the at least two appended audio signals to generate a time domain representation of the audio source.

The at least two recording apparatus may comprise recording apparatus within a first device.

The apparatus may be further caused to perform decoding from each signal at least one audio signal.

According to a second aspect there is provided apparatus comprising at least one processor and at least one memory including computer code for one or more programs, the at least one memory and the computer code configured to with the at least one processor cause the apparatus to at least perform: capturing at least one audio signal representing at least one audio source within an audio scene; selecting a first frequency range from the audio signal; outputting the first frequency range from the audio signal to a further apparatus.

The apparatus may be further caused to perform: estimating the energy of the at least one audio signal; estimating the energy of the first frequency range from the audio signal; outputting with the first frequency range from the audio signal an energy indicator comprising at least one of: the energy of the at least one audio signal; the energy of the first frequency range from the audio signal; the ratio of the energy of the first frequency range from the audio signal to the energy of the at least one audio signal.

The apparatus may be further caused to perform: outputting with the first frequency range from the audio signal an indicator of the first frequency range.

Selecting a first frequency range from the audio signal may cause the apparatus to further perform: time to frequency domain transforming the audio signal representing at least one audio source within an audio scene; and selecting at least one frequency domain representation from the audio signal in the frequency domain, the at least one frequency domain representation being associated with the first frequency range.

Outputting the first frequency range from the audio signal to a further apparatus may further cause the apparatus to perform encapsulating the audio signal in a encapsulated signal format.

According to a third aspect there is provided a method comprising: receiving at least two signals comprising at least two audio signals from at least two recording apparatus recording within an audio scene an audio source, wherein the first of the at least two audio signals is configured to represent a first frequency range and the second of the at least two audio signals is configured to represent a second frequency range; scaling the at least two audio signals; and combining the at least two audio signals to generate a combined audio signal representation of the audio source.

Receiving the at least two signals from at least two recording apparatus may further comprise demultiplexing from each signal at least one of the audio signals.

The method may further comprise demultiplexing from each signal at least one parameter associated with each audio signal.

Scaling the at least two audio signals may further comprise scaling each audio signal dependent on the at least one parameter associated with each audio signal.

Scaling each audio signal dependent on the at least one parameter associated with each audio signal may comprise scaling the at least one audio signal dependent on the estimation of an energy of the audio signal; and an estimation of the ratio of the energy of the audio signal frequency range with respect to a full band energy value.

Each audio signal may be a frequency domain representation audio signal comprising at least one frequency sample value, wherein combining the at least two audio signals to generate a combined audio signal representation of the audio source may comprise appending the at least two audio signals.

The method may further comprise demultiplexing from each encapsulated signal a frequency range indicator associated with each audio signal, wherein appending the at least two audio signals may further comprise appending the at least two audio signals dependent on the frequency range indicator.

The method may further comprise frequency to time domain transforming the at least two appended audio signals to generate a time domain representation of the audio source.

The at least two recording apparatus may comprise recording apparatus within a first device.

The method may further comprise decoding from each signal at least one audio signal.

According to a fourth aspect there is provided a method comprising: capturing at least one audio signal representing at least one audio source within an audio scene; selecting a first frequency range from the audio signal; and outputting the first frequency range from the audio signal to a further apparatus.

The method may further comprise: estimating the energy of the at least one audio signal; estimating the energy of the first frequency range from the audio signal; outputting with the first frequency range from the audio signal an energy indicator including at least one of: the energy of the at least one audio signal; the energy of the first frequency range from the audio signal; the ratio of the energy of the first frequency range from the audio signal to the energy of the at least one audio signal.

The method may further comprise outputting with the first frequency range from the audio signal an indicator of the first frequency range.

Selecting a first frequency range from the audio signal may further comprise: time to frequency domain transforming the audio signal representing at least one audio source within an audio scene; and selecting at least one frequency domain representation from the audio signal in the frequency domain, the at least one frequency domain representation being associated with the first frequency range.

Outputting the first frequency range from the audio signal to a further apparatus may further comprise encapsulating the audio signal in an encapsulated signal format.

According to a fifth aspect there is provided apparatus comprising: means for receiving at least two signals comprising at least two audio signals from at least two recording apparatus recording within an audio scene an audio source, wherein the first of the at least two audio signals is configured to represent a first frequency range and the second of the at least two audio signals is configured to represent a second frequency range; means for scaling the at least two audio signals; and means for combining the at least two audio signals to generate a combined audio signal representation of the audio source.

The means for receiving the at least two signals from at least two recording apparatus may further comprise means for demultiplexing from each signal at least one of the audio signals.

The apparatus may further comprise means for demultiplexing from each signal at least one parameter associated with each audio signal.

The means for scaling the at least two audio signals may further comprise means for scaling each audio signal dependent on the at least one parameter associated with each audio signal.

The means for scaling each audio signal dependent on the at least one parameter associated with each audio signal may comprise means for scaling the at least one audio signal dependent on: the estimation of an energy of the audio signal; and an estimation of the ratio of the energy of the audio signal frequency range with respect to a full band energy value.

Each audio signal may be a frequency domain representation audio signal comprising at least one frequency sample value, wherein the means for combining the at least two audio signals to generate a combined audio signal representation of the audio source may comprise means for appending the at least two audio signals.

The apparatus may further comprise means for demultiplexing from each encapsulated signal a frequency range indicator associated with each audio signal, wherein the means for appending the at least two audio signals may further comprise means for appending the at least two audio signals dependent on the frequency range indicator.

The apparatus may further comprise means for frequency to time domain transforming the at least two appended audio signals to generate a time domain representation of the audio source.

The at least two recording apparatus may comprise recording apparatus within a first device.

The apparatus may further comprise means for decoding from each signal at least one audio signal.

According to a sixth aspect there is provided apparatus comprising: means for capturing at least one audio signal representing at least one audio source within an audio scene; means for selecting a first frequency range from the audio signal; and means for outputting the first frequency range from the audio signal to a further apparatus.

The apparatus may further comprise: means for estimating the energy of the at least one audio signal; means for estimating the energy of the first frequency range from the audio signal; means for outputting with the first frequency range from the audio signal an energy indicator including at least one of: the energy of the at least one audio signal; the energy of the first frequency range from the audio signal; the ratio of the energy of the first frequency range from the audio signal to the energy of the at least one audio signal.

The apparatus may further comprise means for outputting with the first frequency range from the audio signal an indicator of the first frequency range.

The means for selecting a first frequency range from the audio signal may comprise: means for time to frequency domain transforming the audio signal representing at least one audio source within an audio scene; and means for selecting at least one frequency domain representation from the audio signal in the frequency domain, the at least one frequency domain representation being associated with the first frequency range.

The means for outputting the first frequency range from the audio signal to a further apparatus may further comprise means for encapsulating the audio signal in an encapsulated signal format.

According to a seventh aspect there is provided an apparatus comprising: an input configured to receive at least two signals comprising at least two audio signals from at least two recording apparatus recording within an audio scene an audio source, wherein the first of the at least two audio signals is configured to represent a first frequency range and the second of the at least two audio signals is configured to represent a second frequency range; a scaler configured to scale the at least two audio signals; and a combiner configured to combine the at least two audio signals to generate a combined audio signal representation of the audio source.

The input configured to receive the at least two signals from at least two recording apparatus may further comprise a demultplexer configured to demultiplex from each signal at least one of the audio signals.

The demultiplexer may further demultiplex from each signal at least one parameter associated with each audio signal.

The scaler may be further configured to scale each audio signal dependent on the at least one parameter associated with each audio signal.

The scaler scaling each audio signal dependent on the at least one parameter associated with each audio signal may further be configured to scale the at least one audio signal dependent on the estimation of an energy of the audio signal; and an estimation of the ratio of the energy of the audio signal frequency range with respect to a full band energy value.

Each audio signal may be a frequency domain representation audio signal comprising at least one frequency sample value, wherein the combiner may comprise a sample combiner configured to append samples for the at least two audio signals.

The demultiplexer may further be configured to demultiplex from each encapsulated signal a frequency range indicator associated with each audio signal, wherein the sample combiner may be configured to append the at least two audio signals dependent on the frequency range indicator.

The apparatus may comprise a frequency to time domain transformer configured to generate a time domain representation of the audio source.

The at least two recording apparatus may comprise recording apparatus within a first device.

The apparatus may further comprise a decoder configured to decode each at least one audio signal.

According to an eighth aspect there is provided apparatus comprising: a microphone configured to capture at least one audio signal representing at least one audio source within an audio scene; a selector configured to select a first frequency range from the audio signal; and a multiplexer configured to output the first frequency range from the audio signal to a further apparatus.

The apparatus may further comprise an energy estimator configured to estimate the energy of the at least one audio signal and estimate the energy of the first frequency range from the audio signal; the multiplexer further configured to output with the first frequency range from the audio signal an energy indicator including at least one of: the energy of the at least one audio signal; the energy of the first frequency range from the audio signal; the ratio of the energy of the first frequency range from the audio signal to the energy of the at least one audio signal.

The multiplexer may further be configured to output with the first frequency range from the audio signal an indicator of the first frequency range.

The apparatus may further comprise a time to frequency domain transformer configured to time to frequency domain transform the audio signal representing at least one audio source within an audio scene; and the selector may be configured to select at least one frequency domain representation from the audio signal in the frequency domain, the at least one frequency domain representation being associated with the first frequency range.

The multiplexer may be configured to encapsulate the audio signal in a encapsulated signal format.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For better understanding of the present application, reference will now be made by way of example to the accompanying drawings in which.

EMBODIMENTS OF THE APPLICATION

The following describes in further detail suitable apparatus and possible mechanisms for the provision of effective processor load sharing for audio capture apparatus. In the following examples audio signals and audio capture uploading and processing is described. However it would be appreciated that in some embodiments the audio signal/audio capture, uploading and processing is a part of an audio video system.

The concept of this application is related to assisting in the production of immersive person to person communication and can include video (and in some embodiments synthetic or computer generated content).

In order to provide the best listening or viewing experience the recording apparatus within an event space or event scene can be configured to record or capture the audio data occurring within the audio visual event scene being monitored or listened to. As described herein the event space is typically of a limited physical size where all of the recording apparatus are recording substantially the same audio source. In other words typically the same audio signal is being recorded from different positions, locations or orientations significantly close enough to each other that there would be no significant quality improvement between the audio capture apparatus. For example a concert being recorded by multiple apparatus located in the same area of the concert hall. In most cases the additional recording or capture apparatus would not bring significant additional benefit to the end user experience of the audio scene. Furthermore the multiple recording or capture apparatus, each of which is processing, encoding and uploading audio signals to an audio event or audio scene server creates significant processing and bandwidth load across the recording apparatus and between the recording apparatus and the audio scene server. A significant proportion of the load could be considered to be therefore redundant. In other words there are great inefficiencies in the overall end to end operation of the recording and uploading of the audio scene by such devices as the same content gets recorded and uploaded to the server multiple times.

Figure 3:
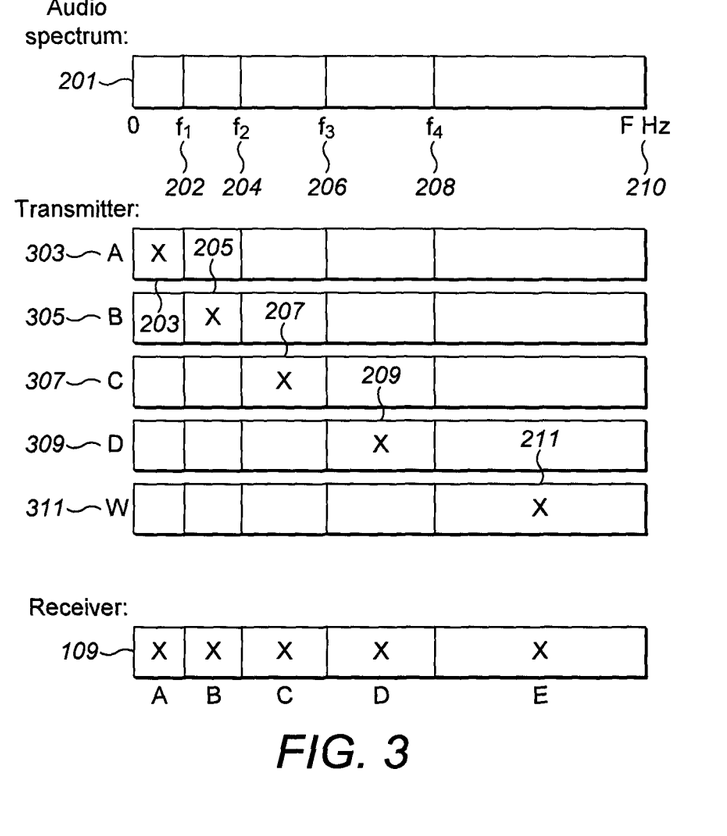
FIG. 3 shows schematically an audio scene audio spectrum represented recording apparatus according to some embodiments of the application.
Figure 4:
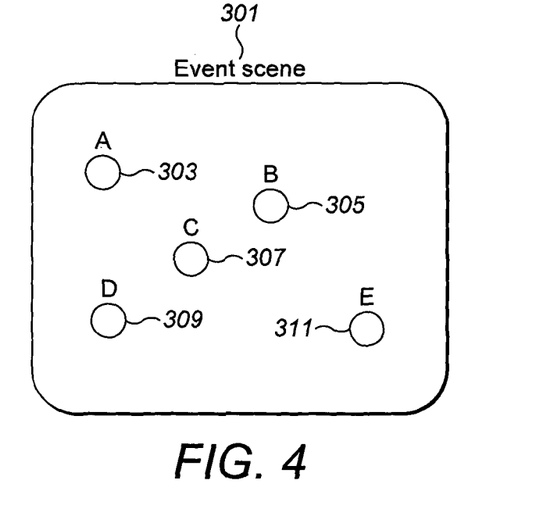
FIG. 4 shows schematically an example audio scene representation map.

An example of the audio event space and the output by the recording apparatus within the event space can be shown with regards to FIGS. 3 and 4.

With respect to FIG. 4 an example physical mapping of an event scene 301 is shown. Within the event scene or space 301 are multiple recording devices or apparatus. For example in this scenario the event scene FIG. 1 comprises a first capture apparatus A 303, a second capture apparatus B 305, a third capture apparatus C 307, a fourth capture apparatus D 309 and a fifth capture apparatus E 311.

With respect to FIG. 3 an example audio spectrum of the audio source denoting the event scene 301 is shown. The source audio spectrum 201 is shown comprising a spectrum from 0 to FHz. Furthermore each of the five capture apparatus A to E capture audio spectra is shown in FIG. 3. Thus for example FIG. 3 shows a first audio spectrum associated with the recording apparatus A, a second audio spectrum associated with the second recording apparatus B, a third audio spectrum associated with the third recording apparatus C, a fourth audio spectrum 309 associated with the fourth recording apparatus D, and a fifth audio spectrum 311 associated with the fifth recording apparatus E. Each spectrum, in such an example, where the capture apparatus are physically located near to each other would be substantially the same as each other. It would be understood that where each of the apparatus captures, processes and uploads its own captured audio then approximately five times the spectrum encoding bandwidth would be required and, as a whole, approximately five times the processing capacity with associated power, battery life and processor complexity cost would also be required as each recording apparatus processes and uploads the audio signal.

The concept of the application as described herein is one where audio scene recording or capturing for multiple users comprises for each of the capture apparatus recording or capturing a frequency range of the audio scene, processing a selected or determined portion of the audio scene spectrum from the captured spectrum frequency, and then at the server rendering the frequency regions from multiple apparatus to obtain a full spectrum signal for the captured audio scene.

As each capture device or apparatus is responsible for a portion of the overall audio signal spectrum, the coding part can be computationally very efficient and implement simple coding audio algorithms whilst the signal quality at the rendering side can be maximised whilst the total bitrate required for the audio scene reduced.

In some embodiments the audio scene server or receiver can be located in the network. Furthermore in some embodiments a recording apparatus or device can act as an audio scene server and be located either within the scene or outside of the physical location of audio scene.

Figure 1:
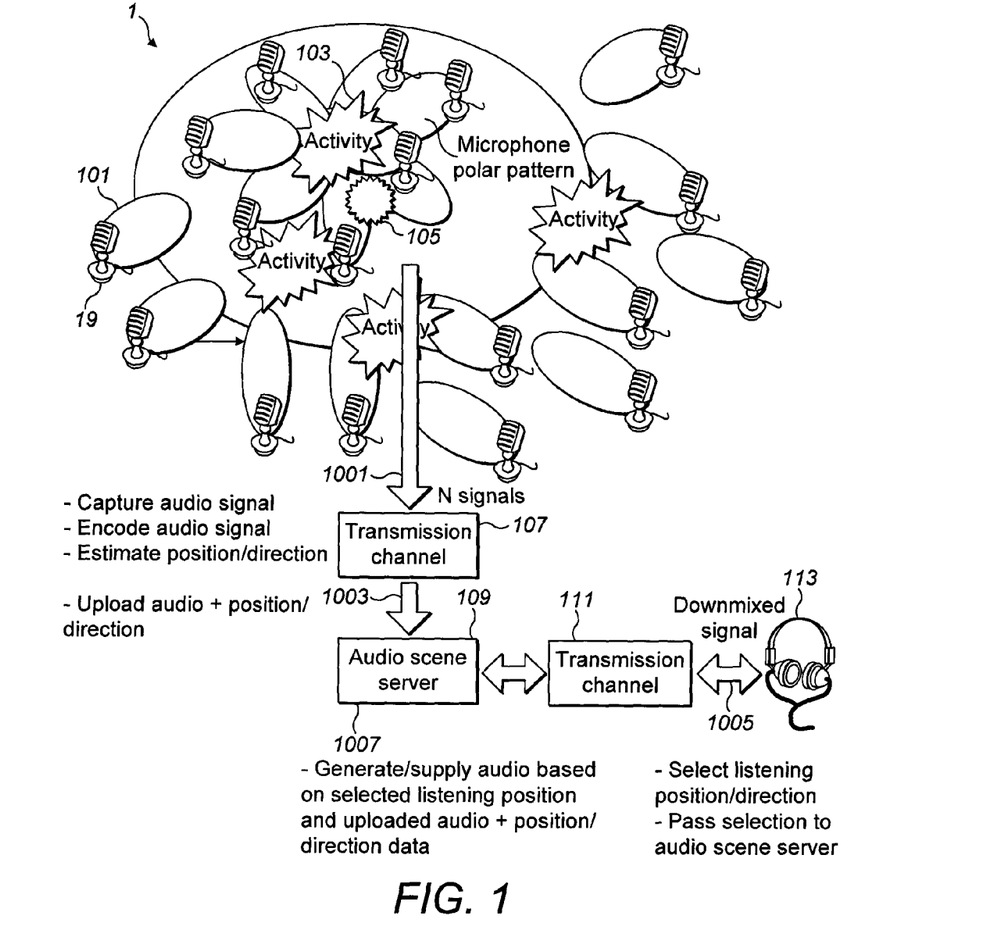
FIG. 1 shows schematically a multi-user free-viewpoint service sharing system which may encompass embodiments of the application.

With respect to FIG. 1 an overview of a suitable system within which embodiments of the application can be located is shown. The audio space 1 can have located within it at least one recording or capturing device or apparatus 19 which are arbitrarily positioned within the audio space to record suitable audio scenes. The apparatus 19 shown in FIG. 1 are represented as microphones with a polar gain pattern 101 showing the directional audio capture gain associated with each apparatus. The apparatus 19 in FIG. 1 are shown such that some of the apparatus are capable of attempting to capture the audio scene or activity 103 within the audio space. The activity 103 can be any event the user of the apparatus wishes to capture. For example the event could be a music event or audio of a news worthy event. The apparatus 19 although being shown having a directional microphone gain pattern 101 would be appreciated that in some embodiments the microphone or microphone array of the recording apparatus 19 has a omnidirectional gain or different gain profile to that shown in FIG. 1.

Each recording apparatus 19 can in some embodiments transmit or alternatively store for later consumption the captured audio signals via a transmission channel 107 to an audio scene server 109. The recording apparatus 19 in some embodiments can encode the audio signal to compress the audio signal in a known way in order to reduce the bandwidth required in "uploading" the audio signal to the audio scene server 109.

The recording apparatus 19 in some embodiments can be configured to estimate and upload via the transmission channel 107 to the audio scene server 109 an estimation of the location and/or the orientation or direction of the apparatus. The position information can be obtained, for example, using GPS coordinates, cell-ID or a-GPS or any other suitable location estimation methods and the orientation/direction can be obtained, for example using a digital compass, accelerometer, or gyroscope information.

In some embodiments the recording apparatus 19 can be configured to capture or record one or more audio signals for example the apparatus in some embodiments have multiple microphones each configured to capture the audio signal from different directions. In such embodiments the recording device or apparatus 19 can record and provide more than one signal from different the direction/orientations and further supply position/direction information for each signal. With respect to the application described herein an audio or sound source can be defined as each of the captured or audio recorded signal. In some embodiments each audio source can be defined as having a position or location which can be an absolute or relative value. For example in some embodiments the audio source can be defined as having a position relative to a desired listening location or position. Furthermore in some embodiments the audio source can be defined as having an orientation, for example where the audio source is a beamformed processed combination of multiple microphones in the recording apparatus, or a directional microphone. In some embodiments the orientation may have both a directionality and a range, for example defining the 3 dB gain range of a directional microphone.

The capturing and encoding of the audio signal and the estimation of the position/direction of the apparatus is shown in FIG. 1 by step 1001.

The uploading of the audio and position/direction estimate to the audio scene server 109 is shown in FIG. 1 by step 1003.

The audio scene server 109 furthermore can in some embodiments communicate via a further transmission channel 111 to a listening device 113.

In some embodiments the listening device 113, which is represented in FIG. 1 by a set of headphones, can prior to or during downloading via the further transmission channel 111 select a listening point, in other words select a position such as indicated in FIG. 1 by the selected listening point 105. In such embodiments the listening device 113 can communicate via the further transmission channel 111 to the audio scene server 109 the request.

The selection of a listening position by the listening device 113 is shown in FIG. 1 by step 1005.

The audio scene server 109 can as discussed above in some embodiments receive from each of the recording apparatus 19 an approximation or estimation of the location and/or direction of the recording apparatus 19. The audio scene server 109 can in some embodiments from the various captured audio signals from recording apparatus 19 produce a composite audio signal representing the desired listening position and the composite audio signal can be passed via the further transmission channel 111 to the listening device 113.

The generation or supply of a suitable audio signal based on the selected listening position indicator is shown in FIG. 1 by step 1007.

In some embodiments the listening device 113 can request a multiple channel audio signal or a mono-channel audio signal. This request can in some embodiments be received by the audio scene server 109 which can generate the requested multiple channel data.

The audio scene server 109 in some embodiments can receive each uploaded audio signal and can keep track of the positions and the associated direction/orientation associated with each audio source. In some embodiments the audio scene server 109 can provide a high level coordinate system which corresponds to locations where the uploaded/upstreamed content source is available to the listening device 113. The "high level" coordinates can be provided for example as a map to the listening device 113 for selection of the listening position. The listening device (end user or an application used by the end user) can in such embodiments be responsible for determining or selecting the listening position and sending this information to the audio scene server 109. The audio scene server 109 can in some embodiments receive the selection/determination and transmit the downmixed signal corresponding to the specified location to the listening device. In some embodiments the listening device/end user can be configured to select or determine other aspects of the desired audio signal, for example signal quality, number of channels of audio desired, etc. In some embodiments the audio scene server 109 can provide in some embodiments a selected set of downmixed signals which correspond to listening points neighbouring the desired location/direction and the listening device 113 selects the audio signal desired.

Figure 2:
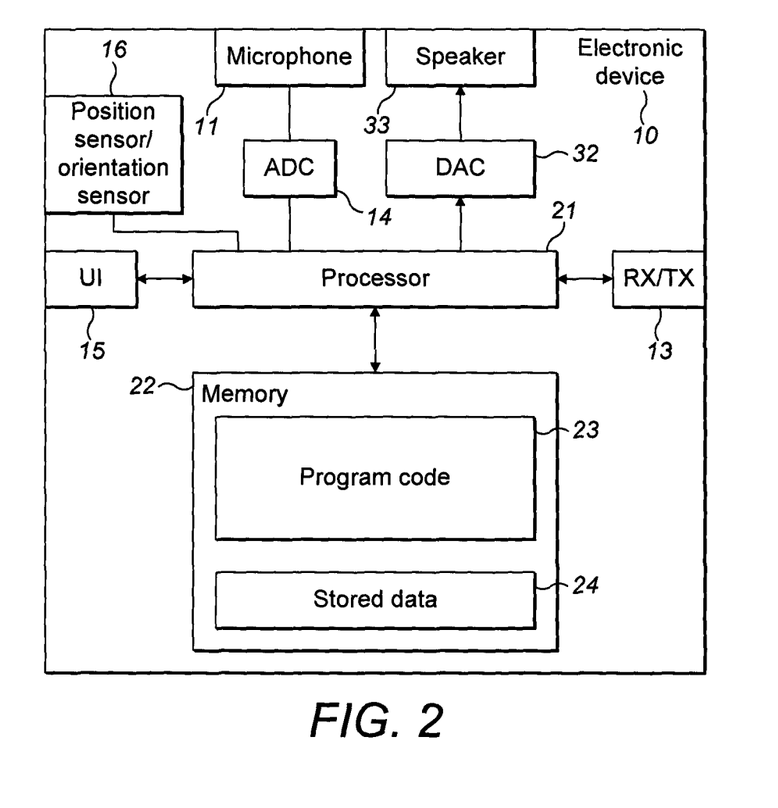
FIG. 2 shows schematically an apparatus suitable for being employed in embodiments of the application.

In this regard reference is first made to FIG. 2 which shows a schematic block diagram of an exemplary apparatus or electronic device 10, which may be used to record (or operate as a recording device 19) or listen (or operate as a listening device 113) to the audio signals (and similarly to record or view the audio-visual images and data). Furthermore in some embodiments the apparatus or electronic device can function as the audio scene server 109.

The electronic device 10 may for example be a mobile terminal or user equipment of a wireless communication system when functioning as the recording device or listening device 113. In some embodiments the apparatus can be an audio player or audio recorder, such as an MP3 player, a media recorder/player (also known as an MP4 player), or any suitable portable device suitable for recording audio or audio/video camcorder/memory audio or video recorder.

The apparatus 10 can in some embodiments comprise an audio subsystem. The audio subsystem for example can comprise in some embodiments a microphone or array of microphones 11 for audio signal capture. In some embodiments the microphone or array of microphones can be a solid state microphone, in other words capable of capturing audio signals and outputting a suitable digital format signal. In some other embodiments the microphone or array of microphones 11 can comprise any suitable microphone or audio capture means, for example a condenser microphone, capacitor microphone, electrostatic microphone, Electret condenser microphone, dynamic microphone, ribbon microphone, carbon microphone, piezoelectric microphone, or microelectrical-mechanical system (MEMS) microphone. The microphone 11 or array of microphones can in some embodiments output the audio captured signal to an analogue-to-digital converter (ADC) 14.

In some embodiments the apparatus can further comprise an analogue-to-digital converter (ADC) 14 configured to receive the analogue captured audio signal from the microphones and outputting the audio captured signal in a suitable digital form. The analogue-to-digital converter 14 can be any suitable analogue-to-digital conversion or processing means.

In some embodiments the apparatus 10 audio subsystem further comprises a digital-to-analogue converter 32 for converting digital audio signals from a processor 21 to a suitable analogue format. The digital-to-analogue converter (DAC) or signal processing means 32 can in some embodiments be any suitable DAC technology.

Furthermore the audio subsystem can comprise in some embodiments a speaker 33. The speaker 33 can in some embodiments receive the output from the digital-to-analogue converter 32 and present the analogue audio signal to the user. In some embodiments the speaker 33 can be representative of a headset, for example a set of headphones, or cordless headphones.

Although the apparatus 10 is shown having both audio capture and audio presentation components, it would be understood that in some embodiments the apparatus 10 can comprise one or the other of the audio capture and audio presentation parts of the audio subsystem such that in some embodiments of the apparatus the microphone (for audio capture) or the speaker (for audio presentation) are present.

In some embodiments the apparatus 10 comprises a processor 21. The processor 21 is coupled to the audio subsystem and specifically in some examples the analogue-to-digital converter 14 for receiving digital signals representing audio signals from the microphone 11, and the digital-to-analogue converter (DAC) 12 configured to output processed digital audio signals. The processor 21 can be configured to execute various program codes. The implemented program codes can comprise for example audio classification and audio scene mapping code routines. In some embodiments the program codes can be configured to perform audio scene event detection and device selection indicator generation, wherein the audio scene server 109 can be configured to determine events from multiple received audio recordings to assist the user in selecting an audio recording which is meaningful and does not require the listener to carry out undue searching of all of the audio recordings.

In some embodiments the apparatus further comprises a memory 22. In some embodiments the processor is coupled to memory 22. The memory can be any suitable storage means. In some embodiments the memory 22 comprises a program code section 23 for storing program codes implementable upon the processor 21. Furthermore in some embodiments the memory 22 can further comprise a stored data section 24 for storing data, for example data that has been encoded in accordance with the application or data to be encoded via the application embodiments as described later. The implemented program code stored within the program code section 23, and the data stored within the stored data section 24 can be retrieved by the processor 21 whenever needed via the memory-processor coupling.

In some further embodiments the apparatus 10 can comprise a user interface 15. The user interface 15 can be coupled in some embodiments to the processor 21. In some embodiments the processor can control the operation of the user interface and receive inputs from the user interface 15. In some embodiments the user interface 15 can enable a user to input commands to the electronic device or apparatus 10, for example via a keypad, and/or to obtain information from the apparatus 10, for example via a display which is part of the user interface 15. The user interface 15 can in some embodiments comprise a touch screen or touch interface capable of both enabling information to be entered to the apparatus 10 and further displaying information to the user of the apparatus 10.

In some embodiments the apparatus further comprises a transceiver 13, the transceiver in such embodiments can be coupled to the processor and configured to enable a communication with other apparatus or electronic devices, for example via a wireless communications network. The transceiver 13 or any suitable transceiver or transmitter and/or receiver means can in some embodiments be configured to communicate with other electronic devices or apparatus via a wire or wired coupling.

The coupling can, as shown in FIG. 1, be the transmission channel 107 (where the apparatus is functioning as the recording device 19 or audio scene server 109) or further transmission channel 111 (where the device is functioning as the listening device 113 or audio scene server 109). The transceiver 13 can communicate with further devices by any suitable known communications protocol, for example in some embodiments the transceiver 13 or transceiver means can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

In some embodiments the apparatus comprises a position sensor 16 configured to estimate the position of the apparatus 10. The position sensor 16 can in some embodiments be a satellite positioning sensor such as a GPS (Global Positioning System), GLONASS or Galileo receiver.

In some embodiments the positioning sensor can be a cellular ID system or an assisted GPS system.

In some embodiments the apparatus 10 further comprises a direction or orientation sensor. The orientation/direction sensor can in some embodiments be an electronic compass, accelerometer, a gyroscope or be determined by the motion of the apparatus using the positioning estimate.

It is to be understood again that the structure of the electronic device 10 could be supplemented and varied in many ways.

Furthermore it could be understood that the above apparatus 10 in some embodiments can be operated as an audio scene server 109. In some further embodiments the audio scene server 109 can comprise a processor, memory and transceiver combination.

Figure 5:
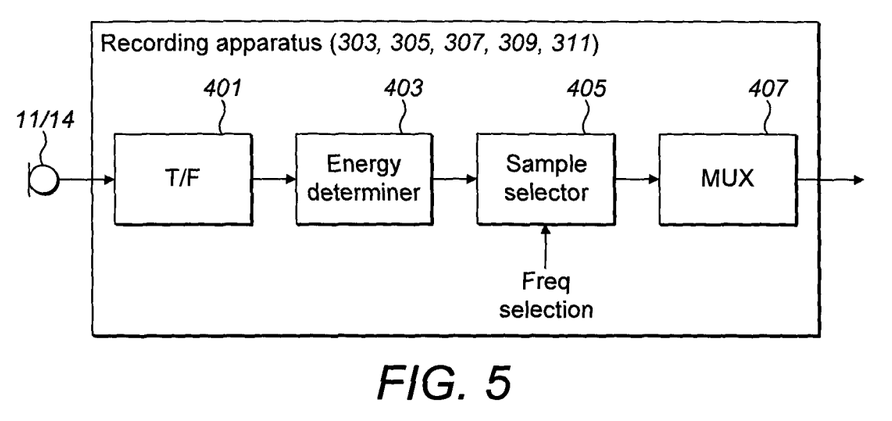
FIG. 5 shows schematically the recording apparatus according to some embodiments of the application.

With respect to FIG. 5 an example capture apparatus 19 according to some embodiments of the application is shown in further detail. Furthermore the operation of the capture apparatus 19 according to some embodiments of the application is described with respect to FIG. 6.

The capture apparatus can in some embodiments comprise a microphone or some suitable means for capturing at least one audio signal representing at least one audio source within an audio scene as described herein. The microphone (which may be part of an audio sub-system 11 14) can be configured to capture the audio signal either in the digital domain or to capture the audio signal in the analogue domain and convert the analogue domain audio signal into the digital domain.

Figure 6:
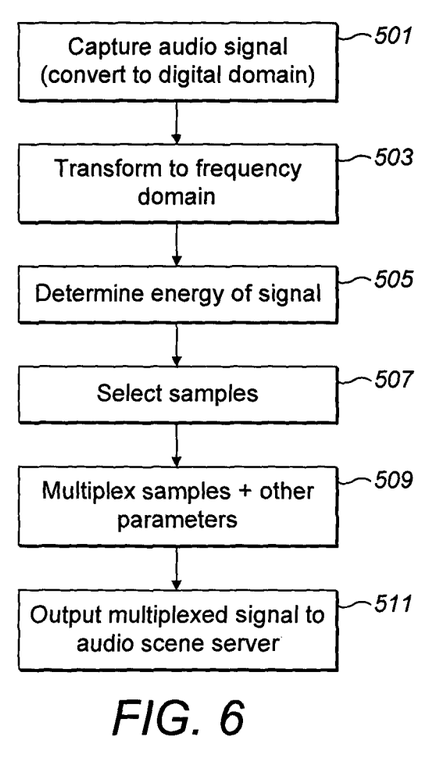
FIG. 6 shows a flow diagram of the operation of the recording apparatus according to some embodiments of the application.

With respect to FIG. 6 the operation of capturing the audio signal is shown by step 501.

The recording apparatus 19 and as shown in FIGS. 3 and 4 by apparatus 303, 305, 307, 309, and 311 can in some embodiments comprise a transformer 401 or suitable means for time to frequency domain transforming the audio signal. The transformer 401 can be configured to apply a transform to the captured digitised time domain microphone signal (x). The transformer 401 in some embodiments can be configured to apply a transform operator to each signal segment according to the following expression:

$$X[bin,l] = TF(x_{bin,l,T}),$$

wherein bin is the frequency bin index, L is the time frame index, T is the hop size between successive segments, and TF( ) is the time to frequency operator.

The time to frequency operator can be any suitable time to frequency transformation operator. In some embodiments the time to frequency operator can be a modified discrete cosine transform (MDCT), modified discrete sine transform (MDST), a Fast Fourier transform (FFT) a discrete cosine transform (DCT) quadrature mirror filter (QMF) and complex valued QMF. For example where the transform operator is a modified discrete cosine transform the transform operator can be represented mathematically as;

$$TF(x_{l,T}) = 2 \cdot \sum_{n=0}^{N-1} x_{in}(n) \cdot \cos\left(\frac{2 \cdot \pi}{N} \cdot \left(n + \frac{N}{4} + 0.5\right) \cdot (k + 0.5)\right),$$

$$0 \le k < \frac{N}{2} - 1$$

$$x_{in}(n) = w(n) \cdot x(n + l \cdot T)$$

where win(n) is a N-point analysis window, such as sinusoidal, Hanning, Hamming, Welch, Bartlett, Kaiser or Kaiser-Bessel Derived (KBD) window.

It would be understood that in order to obtain continuity and maintain smooth MDCT co-efficients over time the hop size can in some embodiments be set to T=N/2. In other words that the previous and current signal segments in such embodiments are 50% overlapping. The application of the time to frequency domain transformation can in some embodiments be employed on a frame by frame basis where the size of the frame is of a short duration. In some embodiments the frame can be 20 ms and typically less than 50 ms.

The operation of performing the time to frequency domain transform is shown in FIG. 6 by step 503.

The transformer 401 can in some embodiments output the frequency domain samples to an energy determiner 403.

In some embodiments the recording apparatus 19 can comprise an energy determiner 403, or suitable means for estimating the energy of the at least one audio signal configured to receive the frequency domain samples and generate an energy value determination. The energy determiner 403 can in some embodiments be configured to determine the total energy of the signal segment being processed. This can mathematically be represented as:

$$E_X = \log 10 \left( \sum_{k=0}^{\frac{N}{2}-1} (X[k,l])^2 \right)$$

Furthermore in some embodiments the energy determiner 403 can be configured to determine the ratio of the energy for the selected frequency region with respect to the overall energy. This ratio can be represented mathematically as $$eRatio = \frac{E_{Xf}}{E_X},$$

where $$E_{Xf} = \log 10 \left( \sum_{k=freqStart}^{freqEnd-1} (X[k,l])^2 \right),$$

where FreqStart and FreqEnd describe the start and end bin indices of the selected frequency region respectively.

The operation of determining the energy of the signal is shown with regards to FIG. 6 by step 505.

It would be understood that the boundaries of the frequency region with respect to each of the recording apparatus can be in some embodiments freely selected or in some further embodiments can follow some predefined boundaries. For example in some embodiments the frequency range boundaries used for dividing the spectrum between the capture apparatus can be matched to utilise human auditory modelling parameters. As the human auditory system operates on a pseudo logarithmic scale this can be represented as non-uniform frequency bands used as they more closely reflect the auditory sensitivity.

In some embodiments the non-uniform bands can follow the boundaries of the equivalent rectangular bandwidth (ERB) which is a measure used in psycho-acoustics giving an approximation to the bandwidth of the filters in human hearing. In some further embodiments of the application the non-uniform bands can follow the boundaries of the bark bands.

Mathematically where the variable 'fbOffset' describes the frequency band boundaries which comprise M frequency bands, the start and end bin indices for the selected frequency region are defined mathematically as:

freqStart=fbOffset[fIdx]

freqEnd=fbOffset[fIdx+1]

where fIdx describes the frequency band index for the selected frequency region. The frequency band index can in some embodiments be received by the recording device or apparatus from the network, randomly selected or be selected according to any suitable method either internally (with respect to the recording apparatus) or system wide and instructed. The exact method for determining the selected frequency region however will not be discussed with regards to this application in order to simplify the understanding of this application.

With respect to FIG. 3 an example spectrum division or region selection for the event scene 301 recording apparatus A 303, B 305, C 307, D 309 and E 311 and the frequency band index for the selected frequency region are shown. Thus for example apparatus A is assigned the frequency region 203 0 Hz to $f_1$ Hz 202, recording apparatus B 305 is assigned the frequency region 205 from $f_1$ 202 to $f_2$ 204, recording apparatus C 307 is assigned the frequency region 207 from $f_2$ 204 to $f_3$ 206, recording apparatus D 309 is assigned the frequency region 209 from $f_3$ 206 to $f_4$ 208 and recording apparatus E 311 is assigned the frequency region 211 from $f_4$ 208 to F 210.

The determined energy indices, and furthermore in some embodiments the frequency selection information, can be passed to the sample selector 405.

In some embodiments the recording apparatus comprises a sample selector 405 or suitable means for selecting a first frequency range from the audio signal for example means for example in the frequency domain representation means for selecting at least one frequency domain representation from the audio signal in the frequency domain. The sample selector is configured to filter or select frequency samples which lie within the determined frequency selection range. The sample selector 405 can be mathematically represented as follows:

$Y_d = X[k,l]$, freqStart ≤ k < freqEnd

The selected samples $Y_d$ can then be passed to the multiplexer 407.

The selection of samples relating the determined frequency range as shown in FIG. 6 by step 507.

In some embodiments the recording apparatus 19 can further comprise a multiplexer 407 or suitable means for encapsulating the audio signal in an encapsulated signal format. The multiplexer 407 is configured to receive the selected samples, together with various parameters, and multiplex or encode the values into a suitable encoded form to be transferred to the audio scene server 109. In some embodiments the captured signal components and related subcomponents are multiplexed to create an encapsulation format for transmission and storage. The encapsulation format can for example comprise the following elements:

| | |
|---|---|
| $E_X$ | Energy of the captured signal segment |
| eRatio | Energy ratio of selected frequency region with respect to full band energy |
| fIdx | Selected frequency region |
| $Y_d$ | Frequency samples |

The generation or multiplexing the samples and other parameters into an encapsulated file format for transmission to the audio scene server 109 is shown with respect to FIG. 6 by step 509.

Furthermore the multiplexer can then output the multiplexed signal to the audio scene server 109 by a suitable means for outputting the first frequency range from the audio signal to a further apparatus.

The output of the multiplexed signal to the audio scene server can be shown with regards to FIG. 6 in step 511.

It would be understood that the operations of capturing, transforming, energy determination, sample selection, multiplexing and outputting can be performed for each time frame index and for each of the recording apparatus.

Figure 7:
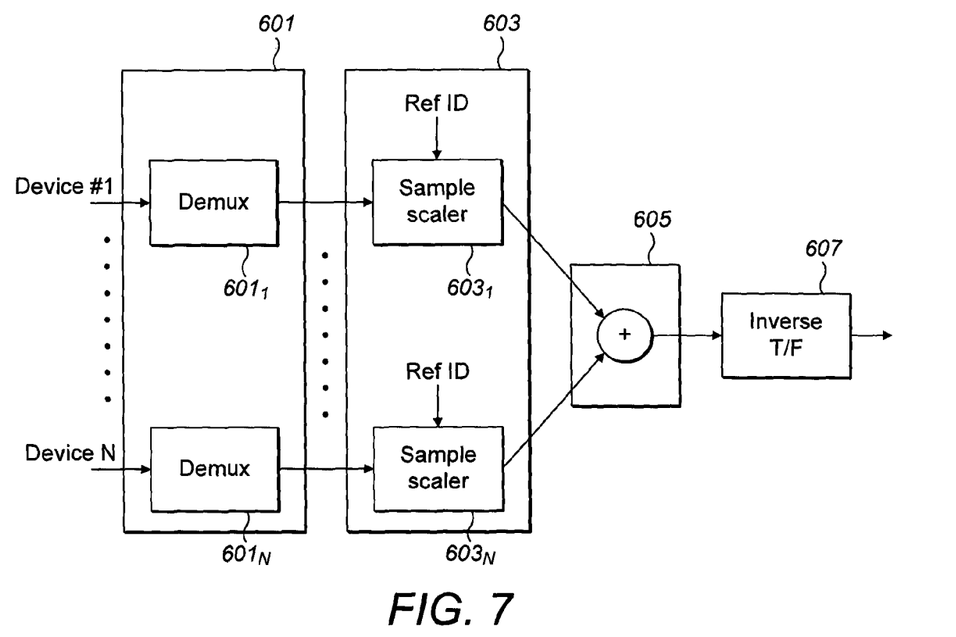
FIG. 7 shows schematically the audio scene server according to some embodiments of the application.
Figure 8:
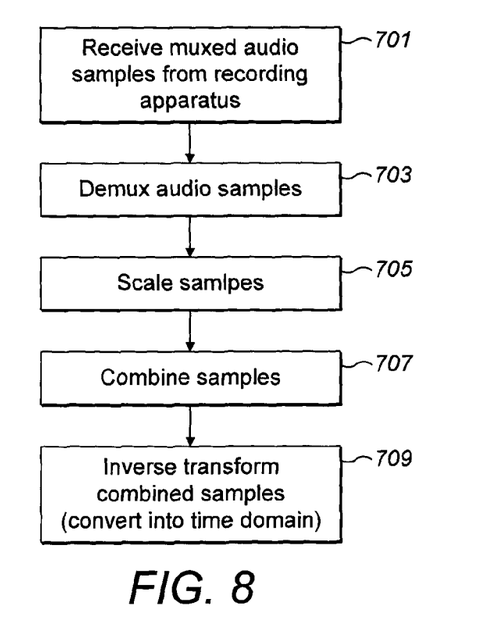
FIG. 8 shows a flow diagram of the operation of the audio scene server according to some embodiments.

With respect to FIGS. 7 and 8 the audio scene server 109 and the operation of the audio scene server according to some embodiments of the application are further described.

In some embodiments the audio scene server or apparatus can comprise means for receiving at least two signals comprising at least two audio signals from at least two recording apparatus recording within an audio scene an audio source, wherein the first of the at least two audio signals Is configured to represent a first frequency range and the second of the at least two audio signals is configured to represent a second frequency range.

The audio scene server 109 can in some embodiments comprise a demultiplexer block 601. The demultiplexer block 601 can be configured to receive from each of the recording apparatus #1 to #N the multiplexed audio samples.

The operation of receiving the multiplexed audio samples from the recording apparatus is shown in FIG. 8 by step 701.

The demultiplexer block 601 or suitable means for demultiplexing from each signal at least one of the audio signals and furthermore in some embodiments means for demultiplexing from each signal at least one parameter associated with each audio signal can further be considered to comprise multiple demultiplexer blocks each associated with a recording apparatus. Thus for example demultiplexer, block $601_1$ is associated with the multiplexed audio samples from recording device or apparatus #1 and demultiplexer block $601_n$ is associated with the recording apparatus #N.

Each of the demultiplexer blocks $601_n$ can be in some embodiments considered to be operating in parallel with each other either partially, completely or be considered to be time division processes running on the same demultiplexer or demultiplexer processor.

The demultiplexer block $601_n$ can be configured to extract the captured signal components and related subcomponents from the received encapsulated format.

Thus, for example, the following elements can for example be retrieved from the multiplexed audio signal such as: $E_x$, the energy of the captured signal segment; eRatio, the energy ratio of the selected frequency region with respect to the full band energy; fIdx, the selected frequency region; and $Y_d$, the frequency samples associated with the selected frequency region of the apparatus. In other words the demultiplexer 601 is configured to reverse the operation of the multiplexer found within each of the recording apparatus.

The demultiplexer 601 can be configured to output the reference identification values, and the samples to a sample scaler 603.

The operation of de-multiplexing the audio samples is shown in FIG. 8 by step 703.

Furthermore in some embodiments the audio scene server 109 further comprises a sample scaler 603 or suitable means for scaling the at least two audio signals. In some embodiment the means for scaling the at least two audio signals comprises means for scaling each audio signal dependent on the at least one parameter associated with each audio signal. The sample scaler can in a manner similar to the demultiplexer block 603 comprise individual sample scaler sub-blocks $603_1$ to $603_n$ each of which is associated with the processing of audio samples associated with the associated recording apparatus n where n=1 to N. the sample scaler 603 can be configured in some embodiments to decode the received frequency samples to the full band frequency spectrum. In some embodiments this can be carried out mathematically according the following expression:

$$Y_{id}[k,l] = Y_d[k-\text{freqStart}], \text{freqStart} \le k < \text{freqEnd}$$

$$\text{freqStart} = \text{fbOffset}[\text{fIdx}]$$

$$\text{freqEnd} = \text{fbOffset}[\text{fIdx}+1]$$

where $Y_{id}$ is initially a zero valued vector or a null vector and the value id describes the corresponding device index of the received data for the rendering side. Thus for example in some embodiments where the audio scene server receives data from 3 devices the corresponding device indices can be 0, 1, and 2.

Furthermore the sample scaler 603 can be configured in some embodiments to scale the frequency samples for each received device according to the energy of the signal segment and energy ratio of the selected frequency region with respect to the full band energy of a reference capture apparatus. For example in some embodiments the capture apparatus related scaling can be represented mathematically by:

$$Y_{id}[k, l] = fScale \cdot Y_{id}[k, l]$$

$$fScale = \sqrt{\left(\frac{E_{X-refID}}{E_X} \cdot eRatio\right)}$$

It would be understood that the scaling with respect to a reference device provides a greater weighting to the captured content of the reference device with respect to other capture apparatus or devices. Thus for example in some embodiments the ambience of the audio scene can be focussed on the captured content surrounding the reference device rather than generally across all of the devices.

The sample scaler 603 can then be configured to output scaled sample values to a sample combiner 605.

The operation of scaling samples is shown in FIG. 8 by step 705.

In some embodiments the apparatus comprises a sample combiner or suitable means for combining the at least two audio signals to generate a combined audio signal representation of the audio source. The means for combining in some embodiments can comprise means for appending the at least two audio signals. The sample combiner 605 can be configured to receive the scaled samples from each of the sample scaler sub-devices $603_1$ to $603_n$ where there are N recording apparatus inputs and combine these in such a way to generate a single sample stream output.

In some embodiments the combination of the frequency samples from the various apparatus can be represented mathematically according to:

$$Y[k, l] = \sum_{id=0}^{N_{ID}-1} Y_{id}[k, l]$$

Where $N_{ID}$ describes the number of apparatus of devices from which the data has been received.

The combined samples can then be passed to an inverse transformer 607.

The operation of combining the samples is shown in FIG. 8 by step 707.

In some embodiments the audio scene apparatus comprises an inverse transformer 607 or suitable means for frequency to time domain transforming the at least two appended audio signals to generate a time domain representation of the audio source. The inverse transformer 607 can be considered to be any inverse transformation associated with the time to frequency domain transformation described with respect to the recording apparatus. Thus for example where the time-to-frequency domain transform was a modified discrete cosine transform (MDCT) the inverse transform 607 can comprise an inverse modified discrete cosine transform (IMDCT). The IMDCT operation can be mathematically expressed as follows:

$$\hat{y}[k,l] = \frac{2}{N} \cdot w[k] \cdot \sum_{n=0}^{\frac{N}{2}-1} Y[n,l] \cdot \cos\left(\frac{2\cdot\pi}{N}\cdot\left(k+\frac{N}{4}+0.5\right)\cdot(n+0.5)\right),$$

$$0 \le k < N-1$$

$$\tilde{y}[k+l\cdot T] = \hat{y}[k,l] + \hat{y}\left[\frac{N}{2}+k, l-1\right],$$

$$0 \le k < \frac{N}{2}$$

where ŷ[k,−1] is zero valued vector.

The operation of inverting the transform for the combined samples in other words converting the frequency domain samples into the time domain is shown in FIG. 8 by step 709.

It would be understood that in some embodiments the encoding and decoding of the captured content can be applied such that backwards compatibility to existing audio codecs such as advanced audio coding (AAC) is achieved. For example in some embodiments this can be useful where the individually recorded content is consumed also individually. In other words a multi-device rendering is not performed. In some embodiments variations can be performed such that existing coding solutions provide well-established and tested methods for coding. For example in some embodiments the signal processing flow can be

| Capturing and processing according to steps 501, 503 505, 507 | → | Inverse TF | → | Coding (e.g., AAC, MP3) | → | MUX (without $Y_d$) | where the audio scene server operations are similarly.

| Demux (without $Y_d$) | → | 5.1 Decoding | → | (AAC, MP3) TF | → | Steps 703, 705, 707 | → | Inverse TF |

The additional subcomponents as described herein can be embedded into the audio codec bitstreams. These codecs typically offer ancillary data sections where various user data can be stored. In some further embodiments the additional subcomponents can be stored in separate files and not part multiplexed as of the coded bit stream.

Although the above has been described with regards to audio signals, or audio-visual signals it would be appreciated that embodiments may also be applied to audio-video signals where the audio signal components of the recorded data are processed in terms of the determining of the base signal and the determination of the time alignment factors for the remaining signals and the video signal components may be synchronised using the above embodiments of the invention. In other words the video parts may be synchronised using the audio synchronisation information.

It shall be appreciated that the term user equipment is intended to cover any suitable type of wireless user equipment, such as mobile telephones, portable data processing devices or portable web browsers.

Furthermore elements of a public land mobile network (PLMN) may also comprise apparatus as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. Apparatus comprising at least one processor and at least one memory including computer code for one or more programs, the at least one memory and the computer code configured to with the at least one processor cause the apparatus to at least:
   receive at least two signals comprising at least two audio signals from at least two recording apparatus recording a source of audio, wherein the source of audio is within an audio scene, wherein the first of the at least two audio signals is configured to represent a first frequency range and the second of the at least two audio signals is configured to represent a second frequency range;
   demultiplex from each of the at least two signals one of the at least two audio signals;
   demultiplex from each of the at least two signals at least one parameter for each of the at least two audio signals;
   scale each of the at least two audio signals dependent on the at least one parameter for each of the at least two audio signals, wherein the at least one parameter for each of the at least two audio signals comprises an estimation of an energy of an audio signal of the at least two audio signals, and an estimation of the ratio of the energy of the audio signal frequency range with respect to a full band energy value; and
   combine the scaled at least two audio signals to generate a combined audio signal representation of the audio source.

2. The apparatus as claimed in claim 1, wherein each audio signal is a frequency domain representation audio signal comprising at least one frequency sample value, and wherein combining the at least two audio signals to generate a combined audio signal representation of the audio source causes the apparatus to append the at least two audio signals.

3. The apparatus as claimed in claim 2, wherein the apparatus is further caused to demultiplex from each encapsulated signal a frequency range indicator associated with each audio signal, wherein appending the at least two audio signals further causes the apparatus to append the at least two audio signals dependent on the frequency range indicator.

4. The apparatus as claimed in claim 2, wherein the apparatus is further caused to perform a frequency to time domain transform on the at least two appended audio signals to generate a time domain representation of the audio source.

5. A method comprising:
   receiving at least two signals comprising at least two audio signals from at least two recording apparatus recording a source of audio, wherein the source of audio is within an audio scene, wherein the first of the at least two audio signals is configured to represent a first frequency range and the second of the at least two audio signals is configured to represent a second frequency range;
   demultiplexing from each of the at least two signals one of the at least two audio signals;
   demultiplexing from each of the at least two signals at least one parameter for each of the at least two audio signals;
   scaling each of the at least two audio signals dependent on the at least one parameter for each of the at least two audio signals, wherein the at least one parameter for each of the at least two audio signals comprises an estimation of an energy of an audio signal of the at least two audio signals, and an estimation of the ratio of the energy of the audio signal frequency range with respect to a full band energy value; and
   combining the scaled at least two audio signals to generate a combined audio signal representation of the audio source.

6. The method as claimed in claim 5, wherein each audio signal is a frequency domain representation audio signal comprising at least one frequency sample value, wherein combining the at least two audio signals to generate a combined audio signal representation of the audio source comprises appending the at least two audio signals.

7. The method as claimed in claim 6, further comprising demultiplexing from each encapsulated signal a frequency range indicator associated with each audio signal, wherein appending the at least two audio signals further comprises appending the at least two audio signals dependent on the frequency range indicator.

8. The method as claimed in claim 6, further comprising frequency to time domain transforming the at least two appended audio signals to generate a time domain representation of the audio source.

9. A computer program product comprising a non-transitory computer-readable medium bearing computer program code embodied therein, the computer program code configured to cause an apparatus at least to perform:
   receiving at least two signals comprising at least two audio signals from at least two recording apparatus recording a source of audio, wherein the source of audio is within an audio scene, wherein the first of the at least two audio signals is configured to represent a first frequency range and the second of the at least two audio signals is configured to represent a second frequency range;
   demultiplexing from each of the at least two signals one of the at least two audio signals;
   demultiplexing from each of the at least two signals at least one parameter for each of the at least two audio signals;
   scaling each of the at least two audio signals dependent on the at least one parameter for each of the at least two audio signals, wherein the at least one parameter for each of the at least two audio signals comprises an estimation of an energy of an audio signal of the at least two audio signals, and an estimation of the ratio of the energy of the audio signal frequency range with respect to a full band energy value; and
   combining the scaled at least two audio signals to generate a combined audio signal representation of the audio source.

10. The computer program product as claimed in claim 9, wherein each audio signal is a frequency domain representation audio signal comprising at least one frequency sample value, wherein the computer program code configured to cause the apparatus at least to perform combining the at least two audio signals to generate a combined audio signal representation of the audio source is further configured to cause the apparatus at least to perform appending the at least two audio signals.

11. The computer program product as claimed in claim 10, wherein the computer program code is further configured to cause the apparatus to perform further demultiplexing from each encapsulated signal a frequency range indicator associated with each audio signal, wherein appending the at least two audio signals further comprises appending the at least two audio signals dependent on the frequency range indicator.

12. The computer program product as claimed in claim 10, wherein the computer program code is further configured to cause the apparatus to perform further frequency to time domain transforming the at least two appended audio signals to generate a time domain representation of the audio source.

\* \* \* \* \*